(12) United States Patent
Berrocal et al.

(10) Patent No.: US 7,964,998 B2
(45) Date of Patent: Jun. 21, 2011

(54) LINEARLY ACTUATED SWITCH FOR ROBOT CRASH PROTECTOR DEVICE

(75) Inventors: William G. Berrocal, Holly Springs, NC (US); Dana A. Wagner, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 211 days.

(21) Appl. No.: 12/351,495

(22) Filed: Jan. 9, 2009

(65) Prior Publication Data

US 2009/0179504 A1 Jul. 16, 2009

Related U.S. Application Data

(60) Provisional application No. 61/020,664, filed on Jan. 11, 2008.

(51) Int. Cl.
*G05B 19/19* (2006.01)
*H02H 3/00* (2006.01)
(52) U.S. Cl. ........................................ 307/326; 700/258
(58) Field of Classification Search .................. 307/326; 700/245, 258, 264; 901/46; 192/150
See application file for complete search history.

(56) References Cited

U.S. PATENT DOCUMENTS

| 4,842,118 | A | * | 6/1989 | Puzio et al. | 192/150 |
| 5,086,901 | A | * | 2/1992 | Petronis et al. | 192/150 |
| 6,298,282 | B1 | * | 10/2001 | Guldi et al. | 700/245 |
| 6,690,208 | B2 | * | 2/2004 | Gloden et al. | 307/326 |

OTHER PUBLICATIONS

"Mechanical Touch Switch D5B." Data Sheet, 8 pages. www.omron247.com Omron Electronics LLC, Schaumburg, IL.

* cited by examiner

*Primary Examiner* — Albert W Paladini
(74) *Attorney, Agent, or Firm* — Coats & Bennett, P.L.L.C.

(57) ABSTRACT

A linearly actuated switch assembly is adjustably disposed in a housing stem bore of a robotic crash protector device. An actuation plate is disposed over the central bore of the contact surface. As the piston moves toward the housing base in response to a crash force or torque applied to the actuator, the actuation plate moves in an axial direction, and contacts and actuates the switch. The actuation plate is biased towards the contact surface by an actuation spring disposed between the actuation plate and a spring plate that is rigidly affixed to the housing stem. This arrangement allows the actuation plate to "float" with respect to the fixed spring plate. In particular, the actuation plate may assume the orientation of the piston, which may be canted from its default orientation—normal to the device central axis—by uneven application of force by the actuator.

15 Claims, 10 Drawing Sheets

LINEARLY ACTUATED SWITCH FOR ROBOT CRASH PROTECTOR DEVICE

This application claims priority to U.S. Provisional Patent Application Ser. No. 61/020664, titled "Linearly-Actuated Switch for Robot Crash Protector Device," filed Jan. 11, 2008, and incorporated herein by reference in its entirety.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

For safety, and to prevent damage to a robot arm and/or a robotic tool attached to it, crash protector devices are known in the art. A crash protector device is interposed between a robot arm and a robotic tool for detecting and indicating a crash condition, defined as an excessive force or torque applied to the robotic tool, usually as a result of unintended contact. The crash protector device exhibits a predetermined compliance, or allowance of relative movement between the robotic tool and robot arm, prior to indicating a crash condition. The crash condition indication may comprise an electronic signal sent to a robotic controller, which may halt movement of the robotic arm in response, to prevent further damage. The crash protector device mechanically and electrically resets itself when the crash force is removed.

It is desirable for the robot crash protector operation to be rotationally invariant. That is, ideally the same force should result in the same crash protector operation (that is, being within the compliance range or indicate a crash condition) regardless of the radial direction in which the force is applied. In practice, prior art robot crash protector devices exhibit radial variations in the amount of force necessary to trigger a crash condition indication.

Figure 13:
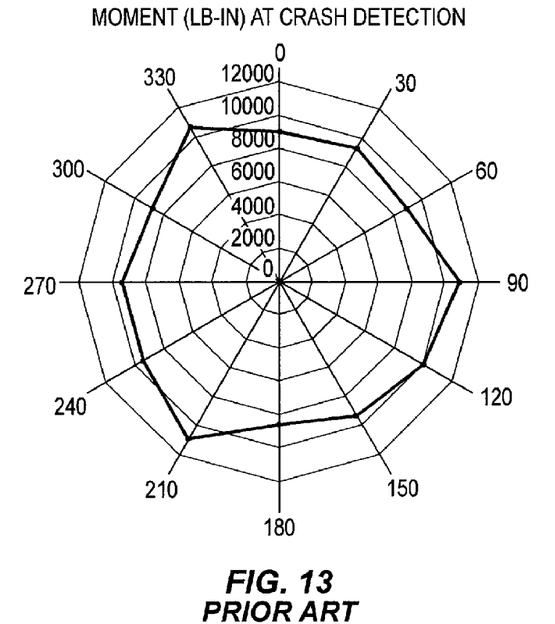
FIG. 13 is a graph of crash force required to indicate a crash condition for different radial directions of a crash force applied to a prior art crash protector device.
Figure 14:
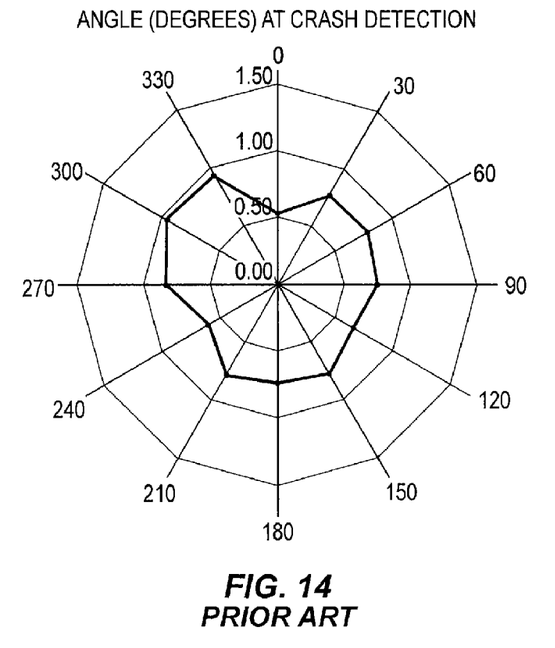
FIG. 14 is a graph of actuator angle at which a crash condition is indicated for different radial directions of a crash force applied to a prior art crash protector device.

FIGS. 13 and 14 depict the moment and angle of deflection, respectively, at crash detection of a prior art crash protector device, for forces applied at radial positions 30° apart. FIG. 13 graphs the force moment that generated a crash condition indication at each indicated radial angle. FIG. 14 graphs the angle of deflection of a portion of the crash protector device attached to a robotic tool, with respect to a portion of the device attached to a robotic arm, at crash condition indication for a force applied at each indicated radial angle. Crash protector devices are made in different sizes, and many have adjustable operating parameters, such that the magnitude of the graphed force values may vary. However, regardless of the magnitude of the applied force required to indicate a crash condition, the crash protector device should ideally show little or no variation in force magnitude or deflection angle at crash condition indication as the crash force is applied in any radial direction. Inspection of FIGS. 13 and 14 indicates significant variation of both required force and deflection angle as the crash force is applied in different radial directions around the axis of the crash protector device.

Additionally, many prior art robot crash protector devices require manual adjustment of internal parts, such as switch assemblies, to achieve acceptable crash protector operation. Manual adjustments increase manufacturing costs and decrease reliability of the crash protector device.

SUMMARY

According to one or more embodiments disclosed and claimed herein, a crash protector device includes a linearly actuated switch assembly to detect and signal a crash condition. Use of the linearly actuated switch assembly improves manufacturability and improves rotational invariance, with respect to applied crash force, in operation.

One embodiment relates to a robotic crash protector device adapted to be interposed between a robot arm and a robotic tool to detect and indicate a crash condition. The device includes a housing connected to one of a robot arm and a robotic tool, the housing having a base and a central axis. The device also includes a piston mounted within the housing and moveable in an axial direction. The device further includes an actuator connected to the other of the robot arm and robotic tool, the actuator contacting the piston and operative to move the piston in an axial direction in response to a crash condition, and a linearly actuated switch disposed within the housing and axially aligned such that a predetermined amount of axial movement of the piston in the housing actuates the switch.

DETAILED DESCRIPTION

Figure 1:
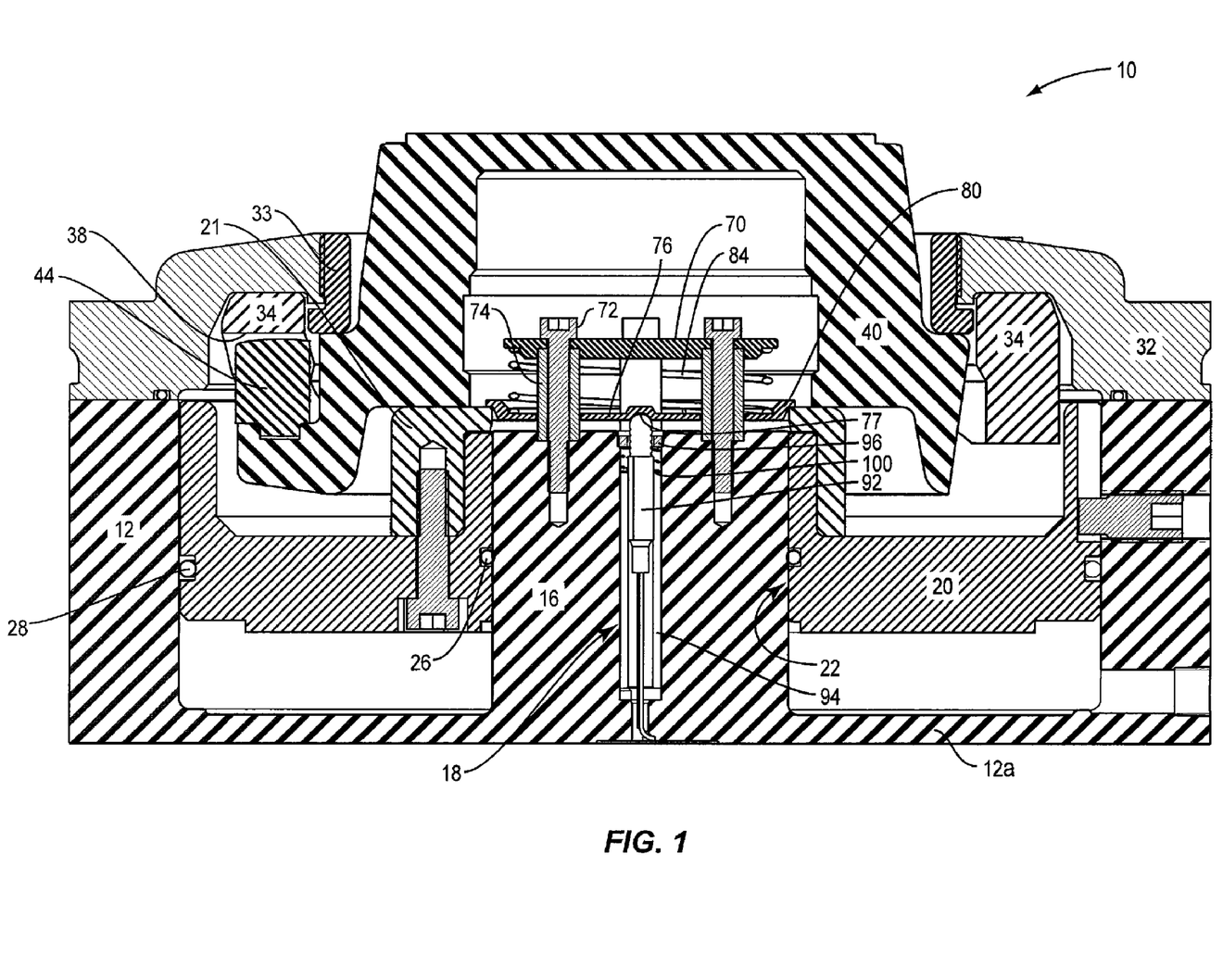
FIG. 1 is a sectional view of a crash protector device according to one embodiment.
Figure 2:
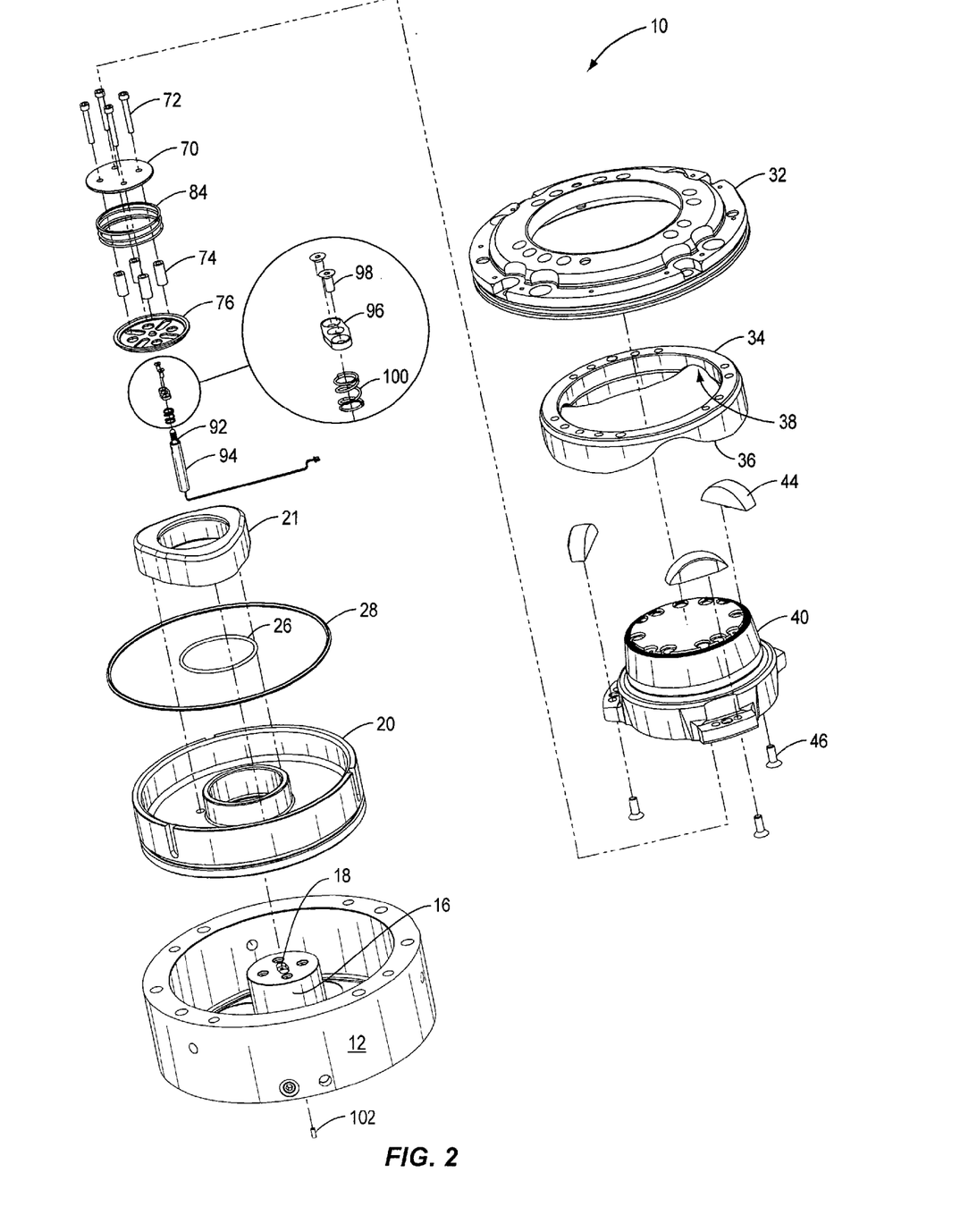
FIG. 2 is an exploded view of the crash protector device of FIG. 1.

FIG. 1 depicts a sectional view, and FIG. 2 a partial exploded view, of a crash protector device 10 according to one embodiment of the present invention. The device 10 includes a housing 12 adapted to be attached to a robot arm (or alternatively to a robotic tool), the housing 12 having a central stem 16 with a bore 18 therethrough, defining a central axis. A piston 20 having a central through-bore 22 is mounted within the housing 12 with the through-bore 22 slideably engaging the housing stem 16. The piston 20 is thus moveable within the housing 12 in an axial direction (up and down, as depicted in FIGS. 1 and 2). A chamber formed between the housing base 12a and the lower surface of the piston 20 is filled with, e.g., compressed air. Pressure is maintained by an O-ring 26 between the housing stem 16 outer surface and piston 20 inner surface; and an O-ring 28 between the piston 20 outer surface and housing 12 inner surface. The compressed air biases the piston 20 away from the housing base 12a.

An actuator 40 adapted to be attached to a robotic tool (or alternatively to a robot arm) contacts a multi-lobed contact surface 21 (itself having a central bore) disposed over a central portion of the piston 20. On the opposite side of the actuator 40 from the piston 20, a cam member 34 and cap 32 are secured to the housing 12, and contain the actuator 40 within the housing 12, biased in a default state to an axially extended position (away from the housing base 12a) by the force of the piston 20. Curved members 44 secured to the actuator 40 engage in U-shaped grooves 38 in a cam surface 36 of the cam member 34, biasing the actuator 40 to a particular rotational orientation in its default, axially extended position.

An axial force applied to an attached robotic tool, and hence to the actuator 40, in the direction of the housing base 12a, forces the actuator 40 against the contact surface 21, moving the piston 20 toward the housing base 12a. A non-axial force on the tool (in any radial direction) "cants" the actuator 40 from its axially aligned position, which also moves the piston 20 toward the housing base 12a. Finally, a rotational torque applied to the tool moves the curved members 44 from the corresponding apexes of the U-shaped grooves 38 in the cam member 34, again moving the actuator 40 and hence the piston 20 toward the housing base 12a.

Any sufficient axial force, radial force, or torque applied to the robotic tool moves the piston 20 away from a default extended position, toward the housing base 12a, against pneumatic pressure. The threshold of force that causes such movement may be adjusted by adjusting the pneumatic pressure beneath the piston 20. The compliance, or degree of movement tolerated prior to triggering an interrupt signal, is adjustable—such as by presetting the position of the actuator 40 in the housing (such as via an annular adjustment ring 33), or adjusting the position of a switch, as explained below, or by other means. When the force or torque is removed, the crash protector device 10 automatically resets to its extended position.

A shortcoming of prior art crash protector devices is that, in the case of a radially-applied crash force, the devices indicate a crash condition in response to a different magnitude of applied force, depending on the radial position of the force, as indicated by the graphs of FIGS. 13 and 14. Note that these graphs depict the result of non-axial forces applied normal to the axis of a crash protector device (that is, horizontally in the configuration of FIGS. 1, 7 and 11). However, those of skill in the art will readily recognize that any non-axial force may be mathematically decomposed into vector components in the axial and normal directions (with respect to the axis of the crash protector device), and the same deficiency of non-uniform crash indication as a function of radial direction applies to the normal component of the applied force. Since this non-uniformity is not an issue in the case of an axial force or torque, the discussion herein focuses on non-axial applied forces, and for simplicity of explanation, forces normal to the crash protector device axis.

A spring plate 70 is rigidly attached to the housing stem 16 by fasteners 72, and spaced apart from the upper surface of the housing stem 16 by standoffs 74. An actuation plate 76 spans the central bore of the piston 20, with cut-outs 78 allowing the fasteners 72 and standoffs 74 to pass through the actuation plate 76. In at least one embodiment, the cut-outs 78 are substantially larger than the standoffs 74, such that the cut-outs 78 do not act as guides or bearings that substantially limit or confine the motion of the actuation plate 76. A circumferential lip 80 formed in the actuation plate 76 engages with the contact surface 21 disposed over part of the piston 20, the actuation plate 76 thus spanning the piston bore 22. The actuation plate 76 is free to move in an axial direction between the housing stem 16 and the spring plate 70. An actuation spring 84 biases the actuation plate 76 away from the spring plate 70, and presses the actuation plate circumferential lip 80 against the contact surface 21. The actuation spring 84 preferably has a diameter only slightly less than the diameter of the actuation plate 76, applying the spring force just inwardly of the actuation plate circumferential lip 80.

A linearly actuated switch assembly 90 is disposed within the central bore 18 of the housing stem 16. The switch assembly 90 comprises a linearly actuated switch 92 adjustably disposed within a switch carrier sleeve 94. For example, the switch 92 may include a threaded portion, and at least a portion of the switch carrier sleeve 94 may include corresponding threads. The switch assembly 90 is confined and positioned within the housing stem bore 18 by a spring stop 96 secured to the housing stem, such as by fasteners 98. A carrier spring 100 disposed beneath the spring stop 96 contacts the switch carrier sleeve 94, biasing it towards the housing base 12a. In addition to adjusting the position of the switch 92 within the switch carrier sleeve 94 by the aforementioned threads, the position of the switch carrier sleeve 94 (and hence the switch assembly 90) within the housing stem bore 18 is adjustable by turning a set screw 102 threadedly disposed in the housing base 12a.

In a default, extended position, the piston 20 is spaced apart from the housing base 12a by operation of pneumatic pressure. The contact surface 21 contacts the actuator 40, urging it to an extended position, resting against the annular adjustment ring 33 and/or cam member 34. In this position, the contact surface 21 lifts the actuation plate 76 off of the housing stem 16 and away from the end of the switch 92, compressing the actuation spring 84.

In the event of a crash condition, the actuator 40 presses the contact surface 21, forcing the piston 20 to move axially toward the housing base 12a. As this occurs, the actuation plate 76 moves toward the housing stem 16. If the movement of the piston 20 is sufficiently large, the actuation plate 76 will contact the end of the linearly actuated switch 92, causing the switch 92 to actuate, or change state (that is, to open the contacts in a normally-closed switch, or to close the contacts in a normally-open switch). In one embodiment, the actuation plate 76 includes a depression 77 positioned and shaped to receive the end of the switch 92. For example, as depicted in FIGS. 1 and 2, the end of the switch 92 and the actuation plate depression 77 are both generally hemispherical.

If a crash force is applied to the actuator 40 (via a robotic tool) in a non-axial direction, the actuator 40 presses the contact surface 21 at a radial position 180° from the applied force—that is, on the other side of the crash protector device 10 central axis. Hence, the force urging the piston 20 towards the housing base 12a is not applied evenly around the circumference of the piston 20 (through the contact surface 21). Due to clearance between the outer walls of the piston 20 and the inner walls of the housing 12, manufacturing tolerances, and the like, this uneven force tends to "cant" the piston from a position perfectly normal to the crash protector device 10 central axis (i.e., from a horizontal position as depicted in FIG. 1). Because the actuation plate 76 "floats" below the rigidly-mounted spring plate 70 the actuation plate 76 conforms to the position of the contact surface 21, and hence the piston 20. That is, the actuation spring 84 may be more compressed on one side than the other, allowing the actuation plate 76 to assume a different orientation than the spring plate 70.

Note that, if the crash condition indication provided by actuation of the switch 92 is ignored (i.e., is not used to halt the movement of the robot arm that generated a crash condition), the piston 20 will continue to move toward the housing base 12a, at least to the extent that the actuator 40 can assume a sufficiently nonaxial position within the housing 12. In this case, the actuation plate 76 will rest on the top of the housing stem 16, and the piston 20 will continue to move axially within the housing 12 toward the housing base 12a. Thus, the configuration of a rigidly mounted spring plate 70 and floating, spring-biased actuation plate 76 allows for continued compliant movement of the crash protector device 10 beyond the threshold at which a crash indication is generated, which may be advantageous in some applications.

As mentioned above, the cut-outs 78 in the actuation plate 76 are in at least some embodiments substantially larger than the standoffs 74, such that the cut-outs 78 do not act as guides or bearings that substantially limit or confine the motion of the actuation plate 76. If this were not the case—i.e., if the standoffs 74 fit tightly in the cut-outs 78, the actuation plate 76 would be largely if not wholly restricted to a position parallel to the rigidly mounted spring plate 70 (horizontal, in the configuration of FIG. 1), even when the contact surface 21 is canted from that plane by a non-axial crash force. In this case, simulation and testing indicates that crash condition indication (i.e., switch 92 actuation) would be non-uniform, and would depend on the radial direction of the applied crash force. For example, a crash force applied in a radial direction aligned with a pair of opposed fasteners 72 would trigger a crash condition indication at a different magnitude than a crash force applied in a radial direction aligned equidistant between adjacent fasteners 72.

Figure 3:
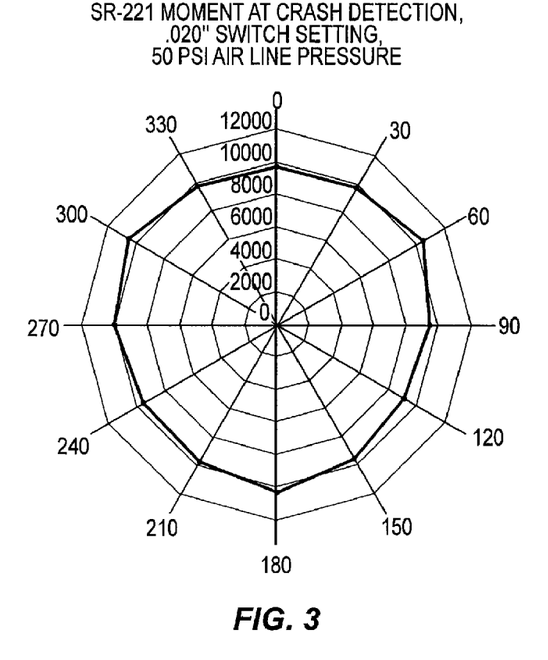
FIG. 3 is a graph of crash force required to indicate a crash condition for different radial directions of the crash force for the crash protector device of FIG. 1 at 50 psi.
Figure 4:
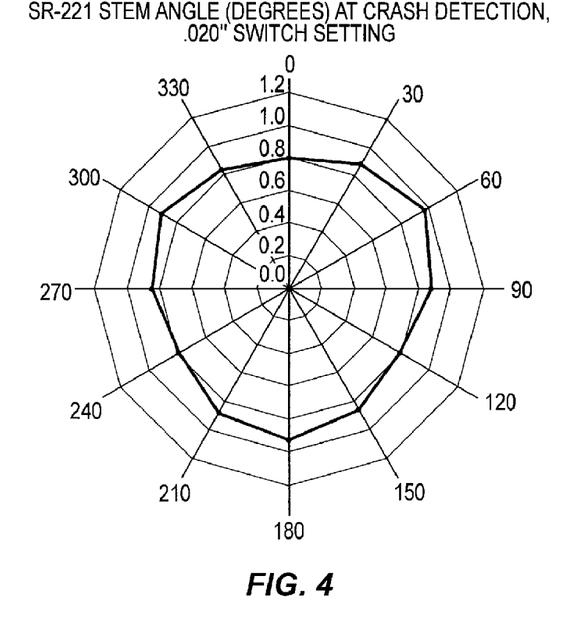
FIG. 4 is a graph of actuator angle at which a crash condition is indicated for different radial directions of the crash force for the crash protector device of FIG. 1 at 50 psi.
Figure 5:
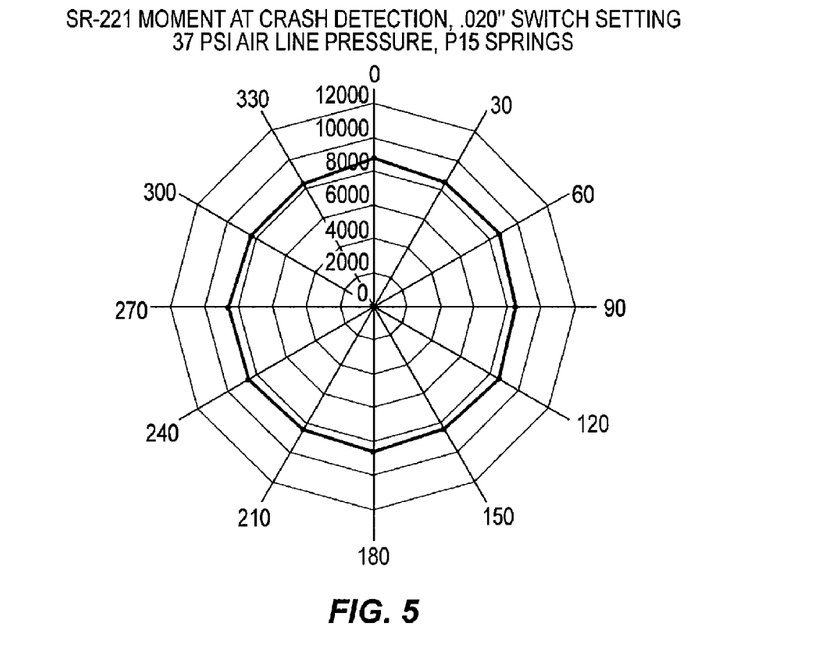
FIG. 5 is a graph of crash force required to indicate a crash condition for different radial directions of the crash force for the crash protector device of FIG. 1 at 37 psi with an additional 13 psi of force supplied with preload springs.
Figure 6:
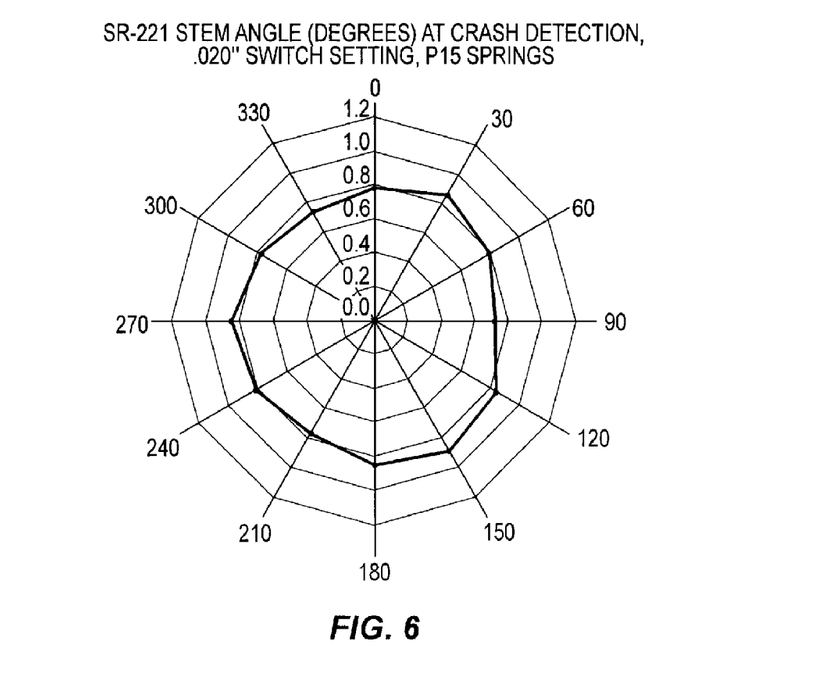
FIG. 6 is a graph of actuator angle at which a crash condition is indicated for different radial directions of the crash force for the crash protector device of FIG. 1 at 37 psi with an additional 13 psi of force supplied with preload springs.

The results of tests performed to determine the variation in load and deflection required to generate a crash condition indication from the crash protector device embodiment of FIGS. 1 and 2 are graphed in FIGS. 3-6. The force required to actuate the crash protector switch was measured at radial locations 30° apart. FIG. 3 graphs the force moment that generated a crash condition indication (i.e., actuated the switch 92) at each indicated radial angle of crash force, under the condition of 50 psi air line pressure. FIG. 4 graphs the angle of deflection of the actuator 40 with respect to the central axis of the housing 12 when the switch 92 actuated at each indicated radial angle of crash force, for the same condition. FIGS. 5 and 6 graph the force moment and actuator 40 deflection angle, respectively, for the same embodiment, under the condition of 37 psi air line pressure, with an additional 13 psi of force supplied with preload springs. Inspection of FIGS. 3, 5 and 4, 6, particularly compared to FIGS. 15 and 16, respectively, indicates minimal variation of both required force and actuator 40 deflection angle as the application of crash force varies radially around the axis of the inventive crash protector device 10.

Figure 7:
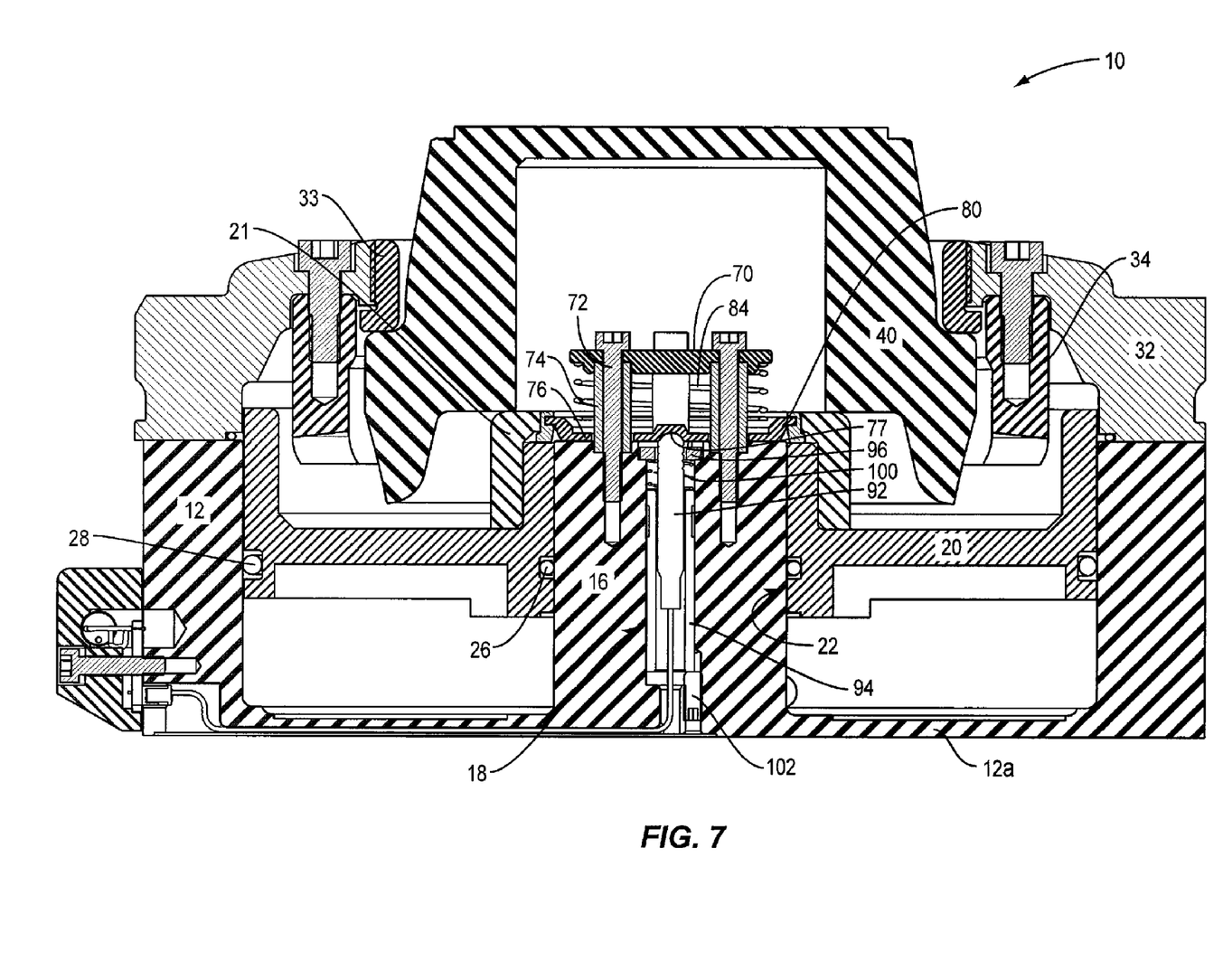
FIG. 7 is a sectional view of a crash protector device according to one embodiment.
Figure 8:
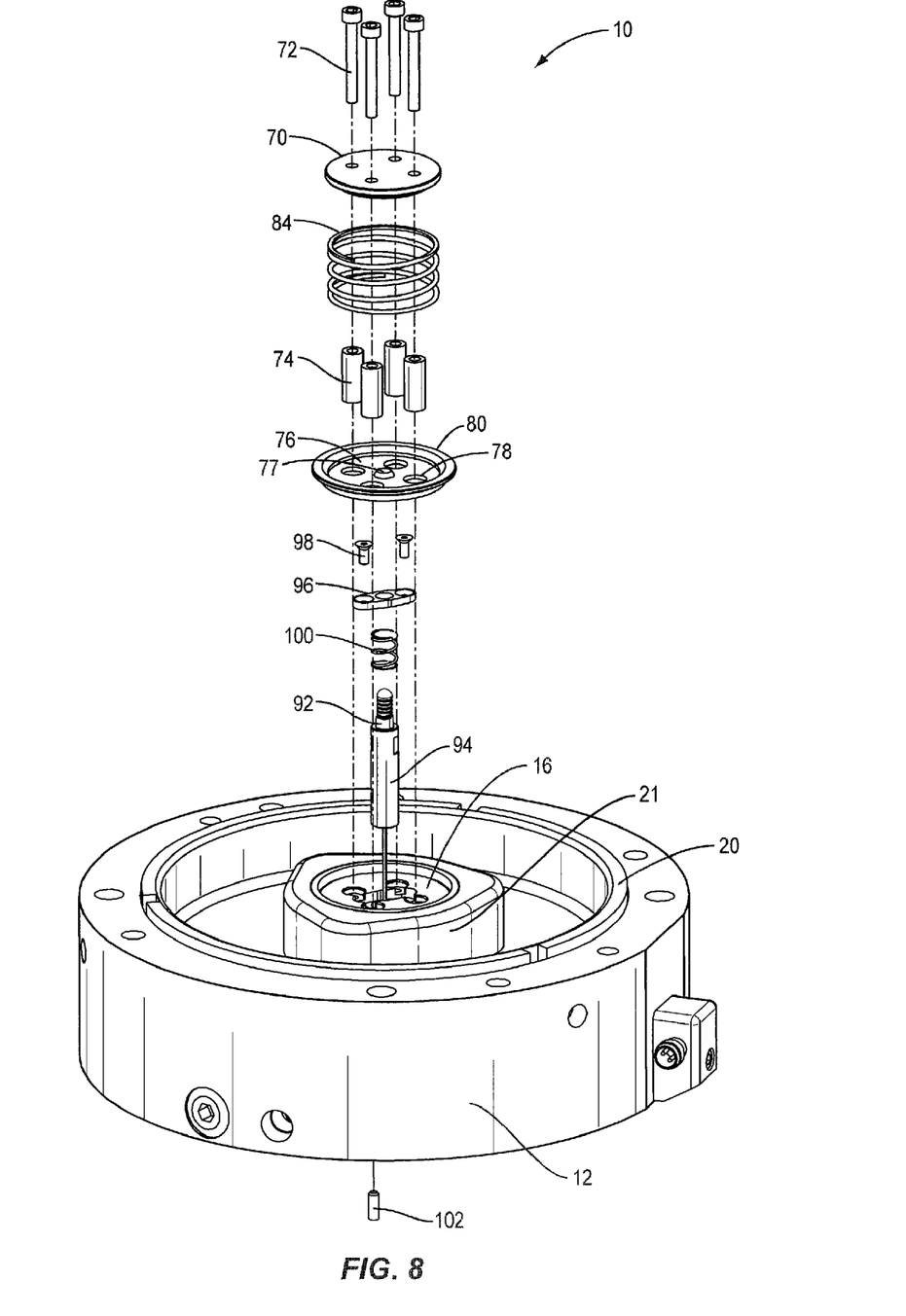
FIG. 8 is an exploded view of the crash protector device of FIG. 7.

FIG. 7 depicts a sectional view, and FIG. 8 a partial exploded view, of a crash protector device 10 according to another embodiment of the present invention. This embodiment is similar to, but smaller than, the embodiment depicted in FIGS. 1 and 2. In particular, the housing stem 16, and hence piston bore 22, has a smaller diameter. Accordingly, the spring plate 70, actuation spring 84, and actuation plate 76 are all smaller, as compared to the corresponding parts in the embodiment of FIGS. 1 and 2. Otherwise, the crash protector device 10 of FIG. 7 functions similarly to the embodiment of FIG. 1.

Figure 9:
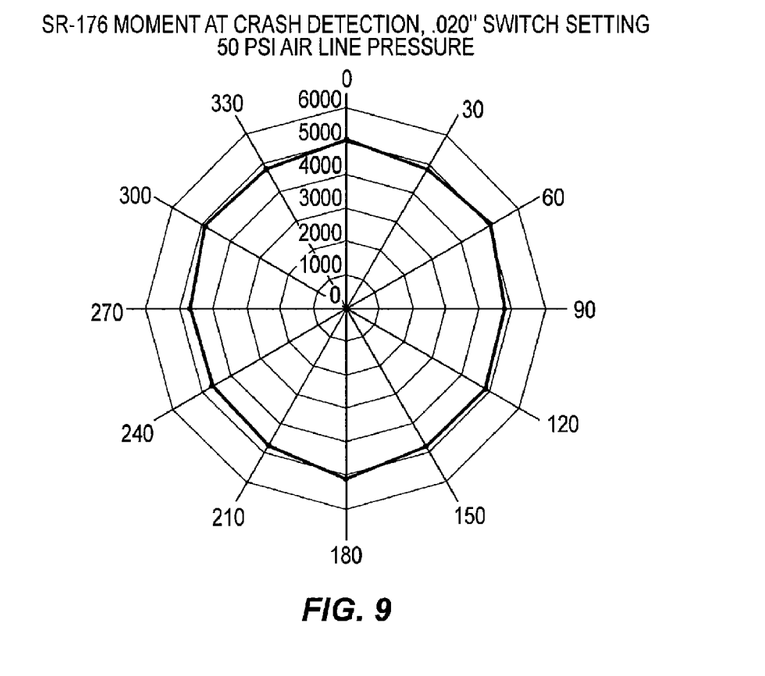
FIG. 9 is a graph of crash force required to indicate a crash condition for different radial directions of the crash force for the crash protector device of FIG. 7.
Figure 10:
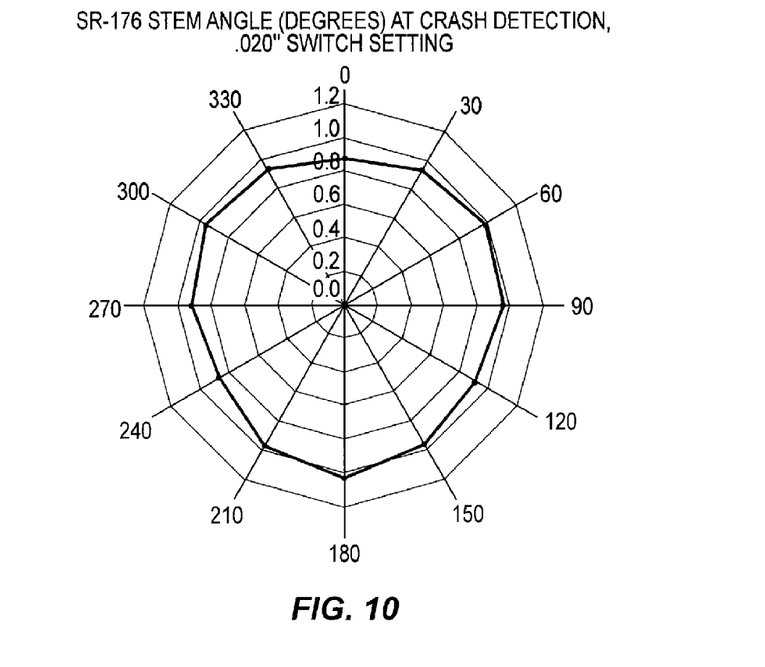
FIG. 10 is a graph of actuator angle at which a crash condition is indicated for different radial directions of the crash force for the crash protector device of FIG. 7.

The results of tests performed to determine the variation in load and deflection required to generate a crash condition indication from the crash protector device embodiment of FIGS. 7 and 8 are graphed in FIGS. 9 and 10, as a crash force is applied in different radial directions. The force required to actuate the crash protector switch was measured at radial locations 30° apart. FIG. 9 graphs the force moment that generated a crash condition indication (i.e., actuated the switch 92) at each indicated radial angle of crash force. FIG. 10 graphs the deflection angle of the actuator 40 with respect to the central axis of the housing 12 when the switch 92 actuated at each indicated radial angle of crash force. Inspection of FIGS. 9 and 10 indicates minimal variation of both required force and actuator 40 deflection angle as the application of crash force varies radially around the axis of the inventive crash protector device 10.

Figure 11:
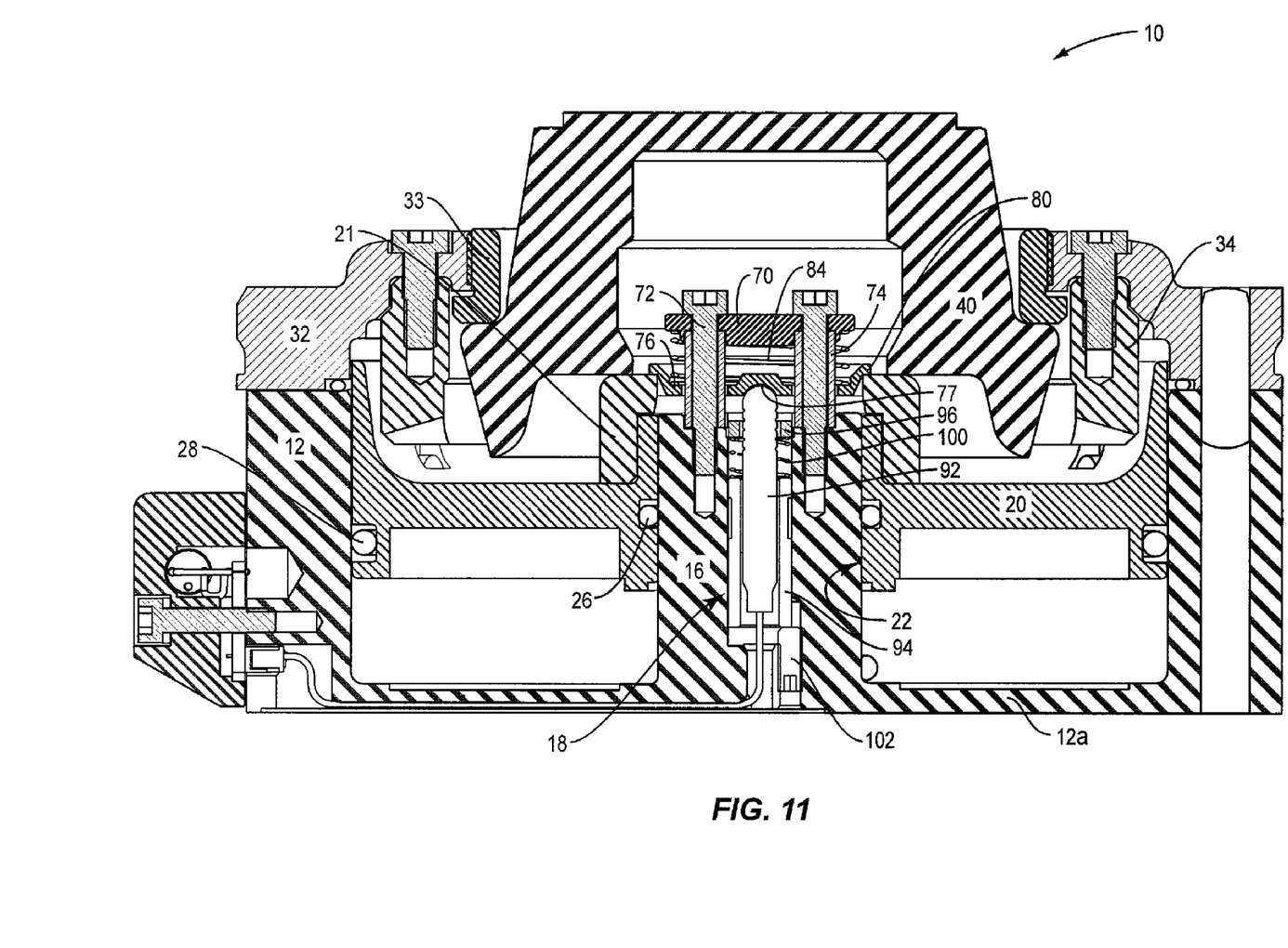
FIG. 11 is a sectional view of a crash protector device according to one embodiment.
Figure 12:
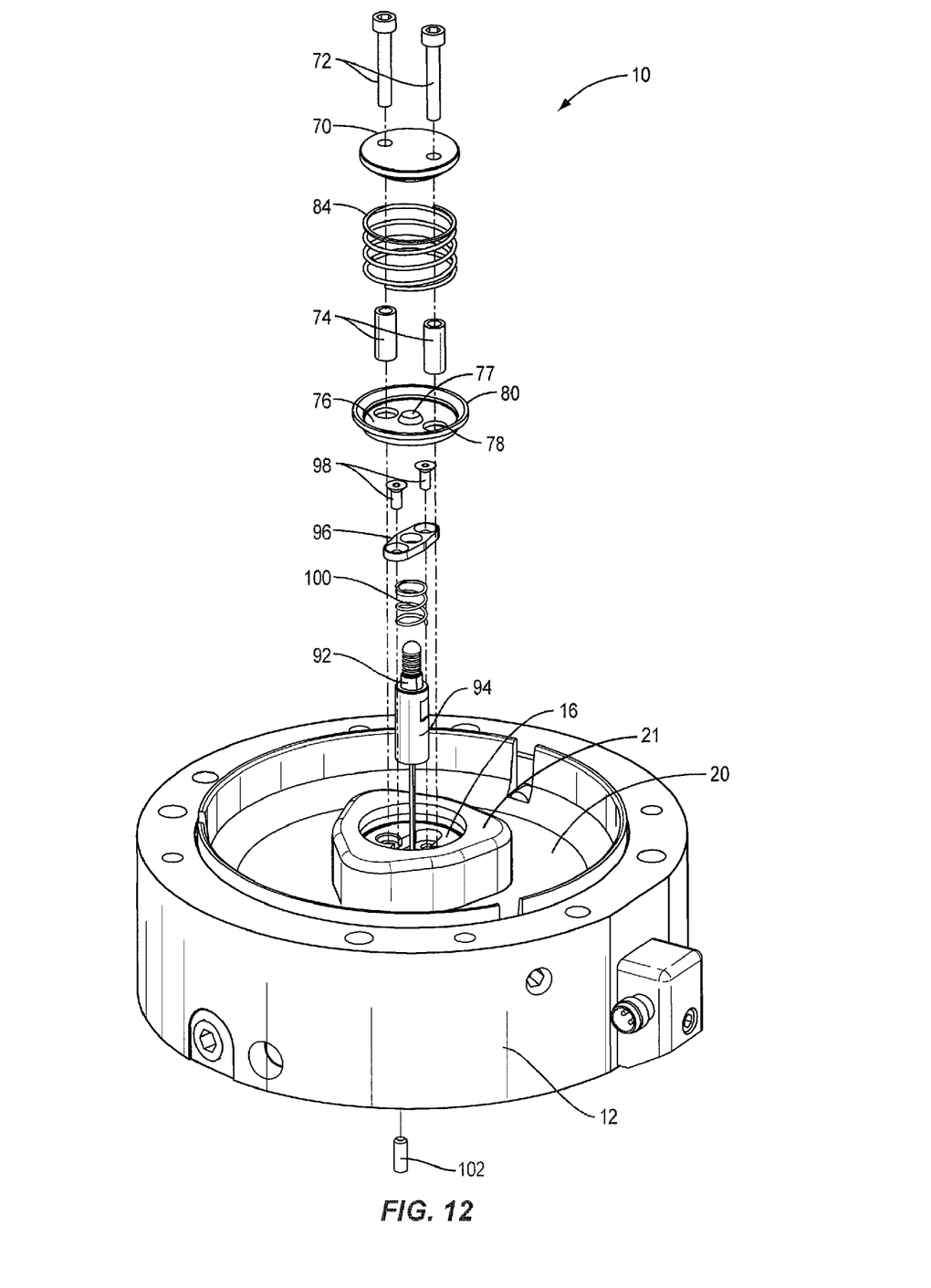
FIG. 12 is an exploded view of the crash protector device of FIG. 11.

FIG. 11 depicts a sectional view, and FIG. 10 a partial exploded view, of yet another embodiment of the crash protector device 10 of the present invention. In general, the redesigned crash protector device 10 of this embodiment is similar to, but smaller than, the embodiment depicted in FIGS. 7 and 8. In particular, the housing stem 16, and hence piston bore 22, has a smaller diameter. Accordingly, the spring plate 70, actuation spring 84, and actuation plate 76 are all smaller, as compared to the corresponding parts in the embodiment of FIGS. 7 and 8. Due to the smaller size and reduced forces encountered, only two fasteners 72 are required to rigidly affix the spring plate 70 to the housing stem 16, as depicted in FIG. 10. Otherwise, the embodiment of the crash protector device 10 of FIG. 7 functions similarly to the embodiment of FIG. 1. Improved uniformity of both crash force required to actuate the switch 92, and the deflection angle of the actuator 40, as the application of crash force varies radially around the axis of the crash protector device 10, were observed as compared to prior art crash protector devices (see, e.g., FIGS. 13 and 14).

The use of a linearly actuated switch 92, actuated by the "floating" actuation plate 96, results in a substantially uniform crash detection force and deflection angle for forces applied radially around the axis of embodiments of the crash protector device 10. In particular, the actuation plate 96 is free to assume the angle of the actuator 40 (attached to a robotic tool), as it is biased from (i.e., "floats over") the spring plate 70 that is rigidly attached to the housing 12 (attached to a robotic arm). Because the switch 92 is actuated solely in an axial direction, the operation of the crash protector device 10 is substantially uniform, or rotationally invariant, with respect to the direction of the applied crash force. Furthermore, the switch 92 may comprise an integral unit, disposed in the (optionally threaded) switch carrier sleeve 94. The position of the switch carrier sleeve 94 (and hence the switch 92) within the bore 18 is determined by the set screw 102. No further adjustment, such as tweaking of the size or shape of switch contacts, is necessary. This greatly improves manufacturability and testing, contributing to the cost effectiveness of embodiments of the crash protector device 10 of the present invention.

As used herein, the term "linearly actuated switch" refers to an electrical switch packaged so as to have a longitudinal axis, that is actuated (i.e., the contacts in a normally-closed switch are opened, or the contacts in a normally-open switch are closed) by a force applied in the longitudinal direction. As one non-limiting example, an electrical switch packaged so as to have a longitudinal axis may comprise a switch in a cylindrical package. Non-limiting examples of linearly actuated switches include the D5B line of mechanical touch switches available from Omron Electronics LLC of Schaumburg, Ill.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic crash protector device adapted to be interposed between a robot arm and a robotic tool to detect and indicate a crash condition in response to a non-axial applied force, comprising:
   a housing adapted to be connected to one of a robot arm and a robotic tool, the housing having a base and a central axis;
   a piston mounted within the housing and moveable in an axial direction;
   an actuator adapted to be connected to the other of the robot arm and robotic tool, the actuator contacting the piston and operative to move the piston in an axial direction in response to a crash condition; and
   a linearly actuated switch disposed within the housing and axially aligned such that a predetermined amount of axial movement of the piston in the housing actuates the switch.

2. The device of claim 1 further comprising an adjustment mechanism operative to adjust the compliance of the crash protector device by adjusting the position of the switch in the housing.

3. The device of claim 2 wherein the adjustment mechanism comprises a screw operative to adjust the axial position of the switch relative to a default position of the piston.

4. The device of claim 1 further comprising a central, axially aligned housing stem having a central bore, and wherein the switch is disposed at least partially in the housing stem bore.

5. The device of claim 4 wherein the piston includes a central through-bore slideably engaging the housing stem and further comprising an actuation plate covering and biased toward one side of the through-bore such that the actuation plate is operative to contact and actuate the switch as the piston moves a predetermined distance in the housing.

6. The device of claim 5 further comprising a spring plate rigidly attached to the housing stem, and wherein the actuation plate is biased towards the piston by a spring disposed between the actuation plate and the spring plate such that the actuation plate may assume a planar orientation different than that of the spring plate.

7. The device of claim 4 wherein compressed air in a chamber between the piston and the housing base biases the piston to a default state wherein the actuation plate does not contact the switch.

8. A robotic crash protector device, comprising:
   a housing for attachment to a robot arm or a robotic tool, the housing containing a first cavity;
   a piston disposed in the housing and containing a bore therethrough, the piston forming a fluid chamber in the first cavity whereby fluid in the chamber urges the piston to a first position;
   an actuator for attachment to the other of the robot arm or the robotic tool, the actuator operative to move the piston from the first position in response to a crash by the robotic tool;
   a linearly actuated switch adjustably disposed in the housing; and
   an actuation plate spanning the piston bore and operative to move with the piston, the actuation plate operative to contact and actuate the linearly actuated switch when the piston moves from the first position by a predetermined amount.

9. The device of claim 8, wherein the sensitivity of the device is adjustable by altering the axial position of the switch within the housing and the bore of the piston when the piston is in the first position.

10. The device of claim 9, wherein placing the switch closer to the actuator increases the sensitivity of the device.

11. An electrical sensor for a robotic crash protector device having a central axis, comprising:
    a switch carrier sleeve axially disposed within the robotic crash protector device and biased toward a first position within the device;
    a linearly actuated switch at least partially disposed within the switch carrier sleeve and maintained in a fixed position within the sleeve;
    an adjustment screw threadedly connected to the robotic crash protector device and abutting the switch carrier sleeve, the adjustment screw operative to alter the axial position of the switch carrier sleeve within the device; and
    an actuation plate disposed within the robotic crash protector device, the actuation plate biased toward an extended position in a default state, and operative to move in an axial direction from the extended position in response to a crash force applied to the device;
    such that the switch assumes a first state when the actuation plate is in the extended position, and is actuated to a second state by the actuation plate moving from the extended position in response to the crash force applied to the device.

12. The sensor of claim 11, wherein the linearly actuated switch and switch carrier sleeve are threaded, and wherein the switch is maintained in a fixed position within the sleeve by the mating of switch and sleeve threads.

13. The sensor of claim 12, wherein the fixed position of the linearly actuated switch within the switch carrier sleeve is set by rotating the switch within the sleeve.

14. A crash protector device having a central axis and operative to indicate crash conditions in a substantially uniform manner for uniform crash forces applied in any radial position about the axis, comprising:
    a housing adapted to be connected to one of a robot arm and a robotic tool, the housing having a base and a central axis;
    an actuator adapted to be connected to the other of the robot arm and robotic tool, the actuator biased to axial alignment with the base in a default condition, and operative to assume a deflection angle with respect to the base under an applied non-axial crash force;

an actuation plate disposed within the crash protector device, biased to an extended position away from the base, and operative to move axially toward the base as the actuator is deflected from axial alignment with the base; and a linearly actuated switch disposed in an adjustably fixed position within the base and aligned along the central axis;

whereby the linearly actuated switch is actuated to indicate a crash condition by the actuation plate when the actuator is deflected from axial alignment to a predetermined amount by a non-axial applied crash force.

15. The device of claim 14 further comprising:

a spring plate rigidly affixed to the base in an alignment normal to the central axis; and an actuation spring disposed between the spring plate and the actuation plate and operative to bias the actuation plate away from the spring plate;

such that, as the actuation plate moves toward the base when the actuator is deflected from axial alignment with the base, the actuation plate may deviate from an alignment normal to the central axis.

* * * * *